United States Patent
Smith et al.

(10) Patent No.: US 11,563,673 B1
(45) Date of Patent: Jan. 24, 2023

(54) NETWORK GATEWAYS WITH REDUNDANT COMMUNICATION CAPABILITY, AND ASSOCIATED METHODS

(71) Applicant: CABLE TELEVISION LABORATORIES, INC., Louisville, CO (US)

(72) Inventors: Luther E. Smith, Fort Lupton, CO (US); Bernard McKibben, Golden, CO (US); Carmela S. Stuart, Broomfield, CO (US); Jonathan Ray Dennis, Aurora, CO (US); Philip Rosenberg-Watt, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/017,472

(22) Filed: Sep. 10, 2020

Related U.S. Application Data

(60) Provisional application No. 62/898,087, filed on Sep. 10, 2019.

(51) Int. Cl.
*H04L 45/00* (2022.01)
*H04L 45/24* (2022.01)

(52) U.S. Cl.
CPC ............. *H04L 45/22* (2013.01); *H04L 45/24* (2013.01)

(58) Field of Classification Search
CPC ......... H04L 45/22; H04L 45/24; H04L 45/28; H04L 45/30; H04L 45/52
See application file for complete search history.

(56) References Cited

U.S. PATENT DOCUMENTS

| | | | | |
|---|---|---|---|---|
| 2006/0262775 | A1* | 11/2006 | Lobig | H04L 65/80 370/352 |
| 2006/0291378 | A1* | 12/2006 | Brotherston | H04L 12/2854 370/221 |
| 2019/0159046 | A1* | 5/2019 | Rucker | H04W 4/70 |
| 2019/0335520 | A1* | 10/2019 | Dion | H04L 12/4633 |
| 2020/0310920 | A1* | 10/2020 | McLaughlin | G05B 19/0428 |
| 2021/0234729 | A1* | 7/2021 | Cloonan | H04L 12/2858 |

* cited by examiner

*Primary Examiner* — Donald L Mills
(74) *Attorney, Agent, or Firm* — PdZ Patent Law, PLLC

(57) ABSTRACT

A method for redundant communication at a network gateway includes (1) exchanging data packets with a network application via a first access communication interface, (2) exchanging data packets with customer premises equipment (CPE) via a local communication interface, and (3) in response to occurrence of a first event, exchanging at least some data packets with the network application via a second access communication interface that is different from the first access communication interface.

20 Claims, 18 Drawing Sheets

NETWORK GATEWAYS WITH REDUNDANT COMMUNICATION CAPABILITY, AND ASSOCIATED METHODS

RELATED APPLICATIONS

This application claims benefit of priority to U.S. Provisional Patent Application Ser. No. 62/898,087, filed on Sep. 10, 2019, which is incorporated herein by reference.

BACKGROUND

Network gateways are used to interface customer premises equipment (CPE) with an access communication network, such as a cable access communication network, a digital subscriber line (DSL) access communication network, an optical access communication network, or a wireless access communication network. As such, a network gateway is key element of a premises communication network. For example, a premises communication network will be inoperable if its network gateway fails.

DETAILED DESCRIPTION OF THE EMBODIMENTS

There is significant interest in achieving high reliability in premises communication networks, such as communication networks in homes and businesses. For example, a home communication network's user may be significantly inconvenienced if the communication network fails. As another example, a business may be unable to operate and thereby loose significant revenue if the business's communication network fails. Furthermore, property damage or even personal injury may result from failure of a communication network which performs an essential function.

Accordingly, many network gateways are now available with a backup power source, such as a backup battery, to power the network gateway in case a primary power source fails. Such inclusion of a backup power source in a network gateway helps achieve reliability by reducing likelihood of downtime due to a power failure. However, conventional network gateways are susceptible to downtime due to failure of an access communication network supporting the network gateway. For example, a network gateway supported by a wireline access network will experience downtime if a cable of the wireline access network is severed. As another example, a network gateway supported by a wireless access network will experience downtime if a wireless base station of the wireless access network suffers storm damage.

Disclosed herein are network gateways with redundant communication capability which at least partially overcome the above discussed drawbacks of conventional network gateways. These new network gateways include a plurality of access communication interfaces, which advantageously enable the network gateways to be supported by two or more different access networks, thereby achieving communication redundancy. Consequently, the new network gateways can continue to operate even if a supporting access network fails. In some embodiments, there is essentially no downtime in event of an access network failure, while in some other embodiments, there is only a short downtime, e.g. less than one minute, in response to an access network failure.

Figure 1:
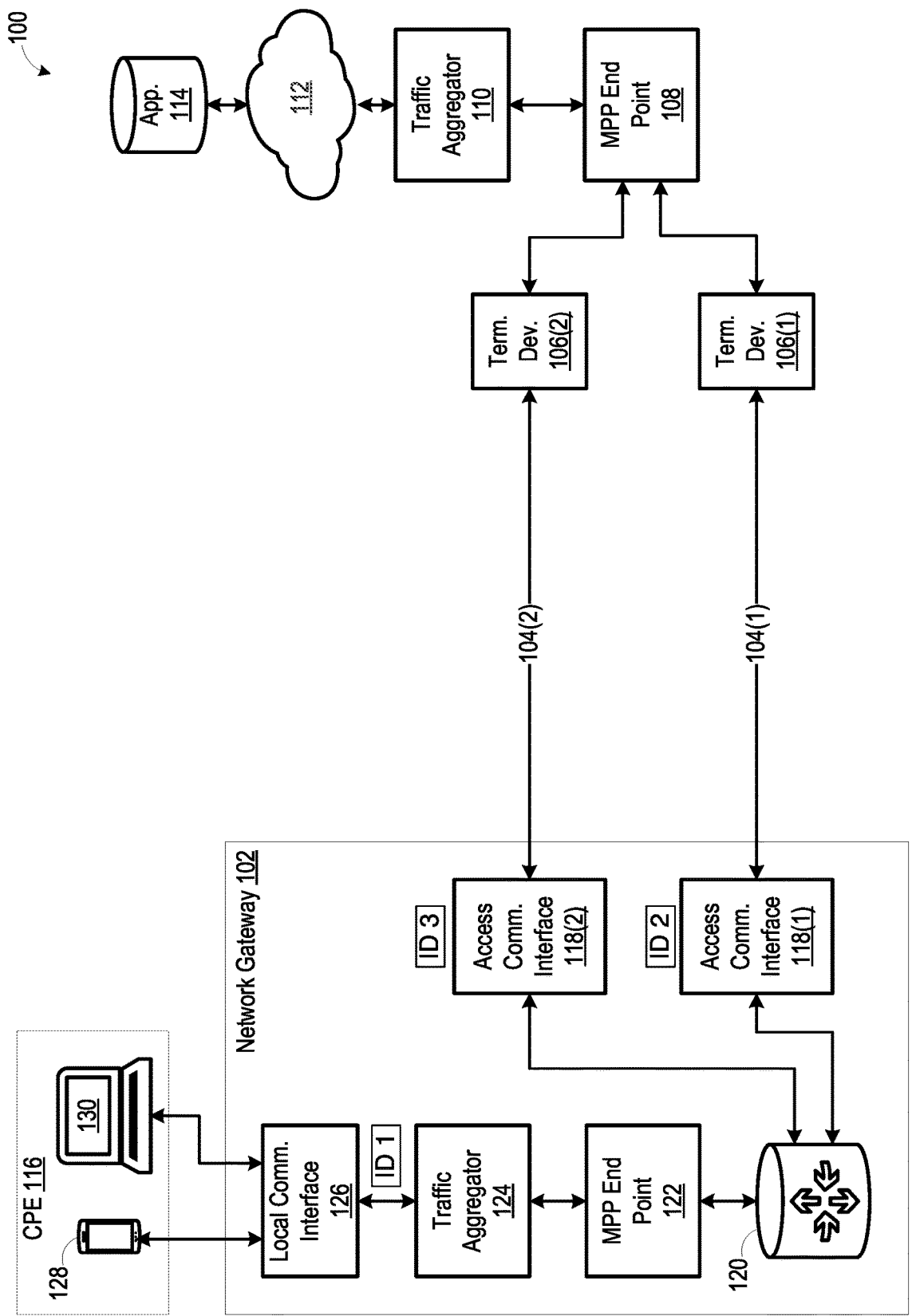
FIG. 1 is a schematic diagram of a communication system including a network gateway with redundant communication capability, according to an embodiment.

FIG. 1 is a schematic diagram of a communication system 100 including a network gateway 102, where network gateway 102 is one embodiment of the new network gateways with redundant communication capability. Communication system 100 further includes a plurality of communication links 104, termination devices 106, a multi-path protocol (MPP) end point 108, a traffic aggregator 110, a network 112, a network application 114, and CPE 116. In this document, specific instances of an item may be referred to by use of a numeral in parentheses (e.g. communication link 104(1)) while numerals without parentheses refer to any such item (e.g. communication links 104). Network gateway 102 includes a plurality of access communication interfaces 118, a router 120, an MPP end point 122, a traffic aggregator 124, and a local communication interface 126.

Network gateway 102 is implemented, for example, by electrical circuitry (not shown) and/or by optical elements (not shown). Network gateway 102 may include additional elements without departing from the scope hereof. Additionally, two or more elements of network gateway 102 may be combined or at least partially implemented by common hardware, software, and/or firmware. For example, in some embodiments, one or more of router 120, MPP end point 122, and traffic aggregator 124 are implemented by common electrical circuitry (not shown). As another example, in some embodiments, one or more of router 120, MPP end point 122, and traffic aggregator 124 are implemented by a processor (not shown) executing non-transitory instructions in the form of software and/or firmware that are stored in a memory subsystem (not shown).

Network 112 includes, for example, the Internet, an Intranet, and/or one or more other communication networks. Network application 114 is communicatively coupled to network 112, and network application 114 includes one or more resources that may be used by CPE 116. Examples of network application 114 include, but are not limited to, a content application, a communication application, a gaming application, a productivity application, etc. Network 112 communicatively couples network application 114 to traffic aggregator 110. Traffic aggregator 110 is communicatively coupled between network 112 and MPP end point 108. Traffic aggregator 110 is configured to aggregate, e.g. encapsulate, downlink data packets from network 112 and transmit the aggregated data packets to MPP end point 108. Additionally, traffic aggregator 110 is configured to de-aggregate, e.g. un-encapsulate, uplink data packets received from MPP end point 108. MPP end point 108 cooperates with MPP end point 122 to establish multi-path communication between network 112 and network gateway 102 via the plurality of communication links 104, using a multi-path data transmission protocol.

Each communication link 104 is, for example, an electrical communication link, an optical communication link, or a wireless communication link. Additionally, in some embodiments, one or more of communication links 104 are a hybrid communication link, e.g. a hybrid optical-electrical communication link, a hybrid optical-wireless communication link, a hybrid electrical-wireless communication link, a hybrid optical-electrical-wireless communication link, etc. Accordingly, in some embodiments, each communication link 104 includes one or more of an electrical cable (e.g. a coaxial electrical cable, a twisted pair electrical cable, an Ethernet electrical cable, a universal serial bus (USB) electrical cable), an optical cable, and wireless transceivers (e.g., wireless radio transceivers and/or wireless optical transceivers). Each communication link 104 communicatively couples a respective termination device 106 and a respective access communication interface 118. Specifically, communication link 104(1) communicatively couples termination device 106(1) and access communication interface 118(1), and communication link 104(2) communicatively couples termination device 106(2) and access communication interface 118(2).

Each termination device 106 is configured to interface its respective communication link 104 with MPP end point 108. Examples of termination devices 106 include, but are not limited to, a cable modem termination system (CMTS), a digital subscriber line access multiplexer (DSLAM), an optical line terminal (OLT), an optical network unit (ONU), a wireless communication station controller, such as a wireless communication system packet core, a wireless communication evolved packet core (EPC), a fifth generation (5G) wireless communication packet core, a sixth generation (6G) wireless communication packet core, a WiFi controller, a satellite communication system controller, a router, a switch, a hub, a USB controller, a Bluetooth controller, and extensions, modifications, and successions of any of the foregoing. Two or more termination device 106 instances could be replaced with a single termination device supporting multiple communication links 104 without departing from the scope hereof.

Each access communication interface 118 is configured to interface its respective communication link 104 with network gateway 102, and each access communication interface 118 need not have the same configuration. In some embodiments, one or more access communication interfaces 118 are a wireless communication interface, including but not limited to a wireless communication interface configured to communicate via a cellular communication protocol (e.g., a Long Term Evolution (LTE) communication protocol, a 5G communication protocol, a 6G communication protocol), a WiFi communication protocol, a satellite communication protocol, a Bluetooth communication protocol, and/or a free space optical communication protocol. In some embodiments, one or more access communication interfaces 118 are an electrical communication interface, including but not limited an electrical communication interface configured to electrically couple to one or more of a coaxial electrical cable, a twisted pair electrical cable, an Ethernet electrical cable, and a USB electrical cable. In some embodiments, one or more of access communication interfaces 118 are an optical communication interface, such as configured to communicatively couple to an optic cable.

Router 120 is configured to route data packets between (a) CPE 116 and (b) each access communication interface 118. Although only a single connection is depicted between router 120 and MPP end point 122, in some embodiments, router 120 forms a separate respective logical connection between each access communication interface 118 and MPP end point 122. As discussed above, MPP end point 122 cooperates with MPP end point 108 to establish multi-path communication between network 112 and network gateway 102 via the plurality of communication links 104, using a multi-path data transmission protocol. In some embodiments, the multi-path data transmission protocol is a multi-path transmission control protocol (MPTCP). Traffic aggregator 124 is configured to aggregate, e.g. encapsulate, uplink data packets from CPE 116 and transmit the aggregated data packets to MPP end point 122. Additionally, traffic aggregator 124 is configured to de-aggregate, e.g. un-encapsulate, downlink data packets received from MPP end point 122.

Local communication interface 126 is configured to interface network gateway 102 with CPE 106. In some embodiments, local communication interface 126 includes one or more of a wireless communication interface (e.g., configured to communicate via a cellular communication protocol (e.g., a LTE communication protocol, a 5G communication protocol, a 6G communication protocol), a WiFi communication protocol, a satellite communication protocol, a Bluetooth communication protocol, and/or a free space optical communication protocol), an electrical communication interface (e.g., configured to electrically couple to one or more of a coaxial electrical cable, a twisted pair electrical cable, an Ethernet electrical cable, and a USB electrical cable), and an optical communication interface (e.g. configured to communicatively couple to an optic cable).

CPE 116 is illustrated as including a mobile telephone 128 and a personal computer 130, which are each illustrated as being communicatively coupled to network gateway 102 via local communication interface 126. For example, in some embodiments, mobile telephone 128 is communicatively coupled to local communication interface 126 via a wireless communication link, and personal computer 130 is communicatively coupled to local communication interface 126 via an Ethernet electrical cable. However, the number of elements of CPE 116, as well as the configuration of each element of CPE 116, may vary without departing from the scope hereof. Examples of possible CPE 116 include, but are not limited to, a mobile telephone, a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless access point, an IAB access point, a microcell, a picocell, a femtocell, a macrocell, a Wi-Fi-based application, a satellite communication device, etc).

Use of MPP end points 108 and 122 advantageously makes presence of the plurality of communication links 114 invisible to network application 114 and CPE 116. Specifically, network gateway 102 presents a single network identifier ID1, which represents the network gateway, to each of network application 114 and CPE 116, even though each access communication interface 118(1) and 118(2) is represented by its own respective network identifier. Specifically, access communication interface 118(1) is represented by a network identifier ID2, and access communication interface 118(2) is represented by a network identifier ID3, where each of ID1, ID2, and ID3 are different. MPP end points 108 and 122 hide presence of ID2 and ID3 to network application 114 and CPE 116, such that network application 114 and CPE 116 are only aware of ID1. In some embodiments, each of ID1, ID2, and ID3 is an Internet Protocol (IP) address, such as a version 4 IP address, a version 6 IP address, or a successor version IP address.

Presence of a plurality of access communication interfaces 118 in network gateway 102 advantageously enables network gateway 102 to be supported by multiple access networks, where each communication link 104 is associated with a respective access network. Consequently, network gateway 102 is capable of continuing to operate in event of failure of one communication link 104. Additionally, in some embodiments, presence of MPP endpoint 122 in network gateway 102 causes failure of a communication link 104 to be imperceptible to CPE 116 and network application 114, such that network gateway 102 does not experience downtime in response to the communication link 104 failure. Furthermore, some embodiments of network gateway 102 are configured to leverage the plurality of access communication interfaces 118 to simultaneously transmit data packets through a plurality of communication links 104, such as to achieve high data transmission throughput.

Figure 2:
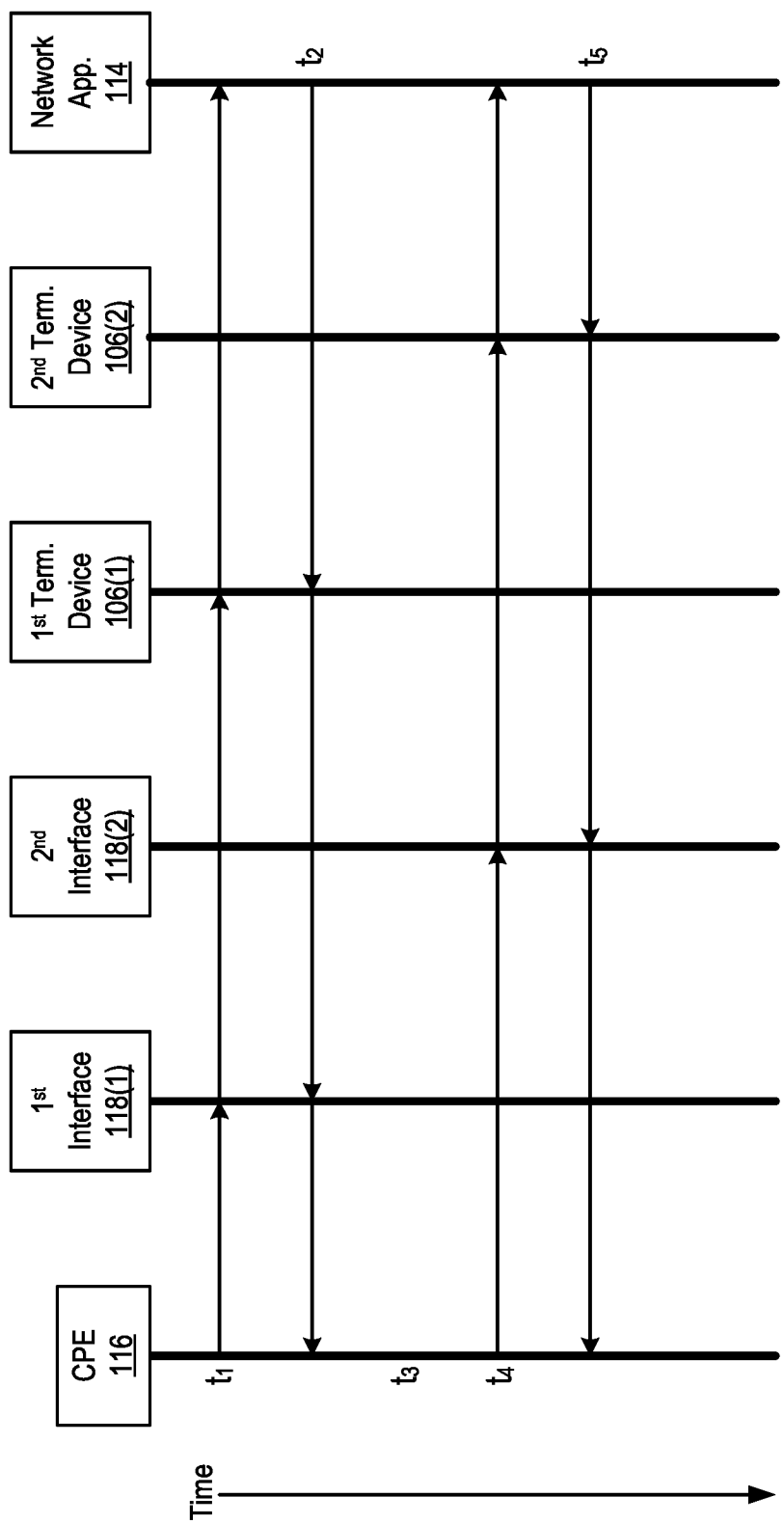
FIG. 2 is a dataflow diagram illustrating one example of operation of the FIG. 1 system.
Figure 3:
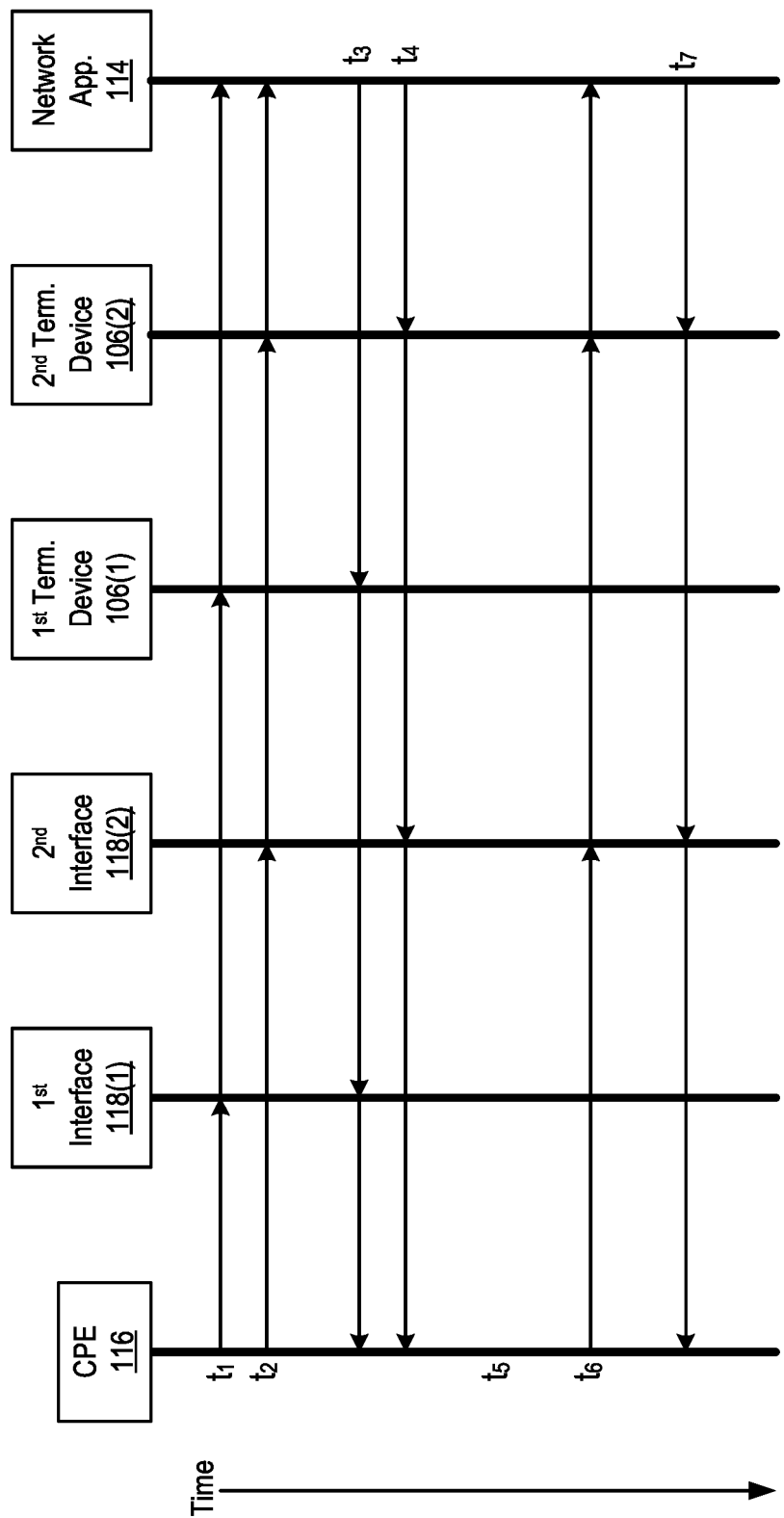
FIG. 3 is a dataflow diagram illustrating another example of operation of the FIG. 1 system.

Each of FIGS. 2 and 3 is a dataflow diagram illustrating a respective example of operation of communication system 100 of FIG. 1. FIGS. 2 and 3 include vertical lines logically representing each of CPE 116, communication interface 118(1), communication interface 118(2), termination device 106(1), termination device 106(2), and network application 114. Network 112, traffic aggregator 110, MPP end point 108, communication links 104, router 120, MPP end point 122, traffic aggregator 124, and local communication interface 126 are not shown in FIGS. 2 and 3 for illustrative clarity.

Referring to FIG. 2 at time $t_1$, uplink data packets are transferred from CPE 116 to network application 114 via access communication interface 118(1), communication link 104(1), and termination device 106(1). At time $t_2$, downlink data packets are transferred from network application 114 to CPE 116 via termination device 106(1), communication link 104(1), and access communication interface 118(1). At time $t_3$ an event occurs, and network gateway 102 transfers data packets between CPE 116 and network application 114 via access interface 118(2), instead of access interface 118(1), in response to the event occurrence. Examples of the event include, but are not limited to, failure of communication link 104(1), degradation of communication link 104(1), congestion on communication link 104(1), or increase in cost to use communication link 104(1). Accordingly, at time $t_4$, uplink data packets are transferred from CPE 116 to network application 114 via access communication interface 118(2), communication link 104(2), and termination device 106(2). At time $t_5$, downlink data packets are transferred from network application 114 to CPE 116 via termination device 106(2), communication link 104(2), and access communication interface 118(2). Thus, network gateway 102 continues to operate by using access communication interface 118(2) and its associated communication link 104(2) despite the event occurrence at time $t_3$.

FIG. 3 illustrates an example of operation of communication system 100 where network gateway 102 initially uses both access communication interfaces 118(1) and 118(2) to transfer data packets between CPE 116 and network application 114, and network gateway 102 subsequently uses only access communication interface 118(2) in response to an event occurrence. At time $t_1$, uplink data packets are transferred from CPE 116 to network application 114 via access communication interface 118(1), communication link 104(1), and termination device 106(1). Additionally, at time $t_2$, uplink data packets are transferred from CPE 116 to network application 114 via access communication interface 118(2), communication link 104(2), and termination device 106(2), such that network gateway 102 essentially uses both communication links 104(1) and 104(2) in parallel. Similarly, at time $t_3$, downlink data packets are transferred from network application 114 to CPE 116 via termination device 106(1), communication link 104(1), and access communication interface 118(1). Additionally, at time $t_4$, downlink data packets are transferred from network application 114 to CPE 116 via termination device 106(2), communication link 104(2), and access communication interface 118(2).

At time $t_5$ an event occurs, and network gateway 102 transfers data packets between CPE 116 and network application 114 via access interface 118(2), instead of access interface 118(1), in response to the event occurrence. Examples of the event include, but are not limited to, failure of communication link 104(1), degradation of communication link 104(1), congestion on communication link 104(1), or increase in cost to use communication link 104(1). Accordingly, at time $t_6$, uplink data packets are transferred from CPE 116 to network application 114 via access communication interface 118(2), communication link 104(2), and termination device 106(2). At time $t_7$, downlink data packets are transferred from network application 114 to CPE 116 via termination device 106(2), communication link 104(2), and access communication interface 118(2). Thus, network gateway 102 continues to operate by using access communication interface 118(2) and its associated communication link 104(2) despite the event occurrence at time $t_5$.

Figure 4:
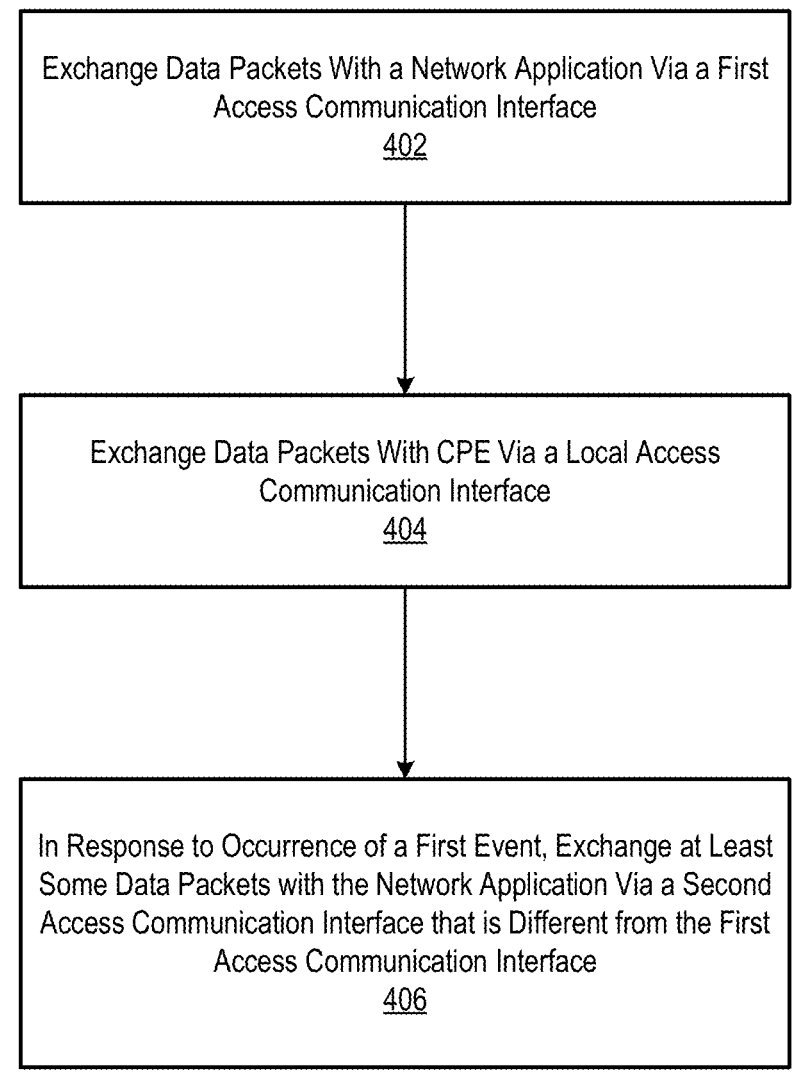
FIG. 4 is a flow chart of a method for redundant communication at a network gateway, according to an embodiment.

FIG. 4 is a flow chart of a method 400 for redundant communication at a network gateway. Although method 400 is discussed below with respect to communication system 100 of FIG. 1, method 400 could be used with other communication systems including network gateway 102, or a variation thereof, without departing from the scope hereof. In a block 402 of method 400, data packets are exchanged with a network application gateway via a first access communication interface. In one example of block 402, network gateway 102 exchanges data packets with network application 114 via access communication interface 118(1). In a block 404 of method 400, data packets are exchanged with CPE via a local access communication interface. In one example of block 404, network gateway 102 exchanges data packets with CPE 116 via local communication interface 126. In a block 406 of method 400, at least some data packets are exchanged with the network application via a second access communication interface that is different from the first access communication interface, in response to occurrence of a first event. In one example of block 406, network gateway 102 exchanges data packets with network application 114 via access communication interface 118(2), in response to an event occurrence. Examples of the event include, but are not limited to, failure of communication link 104(1), degradation of communication link 104(1), congestion on communication link 104(1), increase in cost to use communication link 104(1), or availability of communication link 104(2) after communication link 104(2) was previously unavailable.

Figure 5:
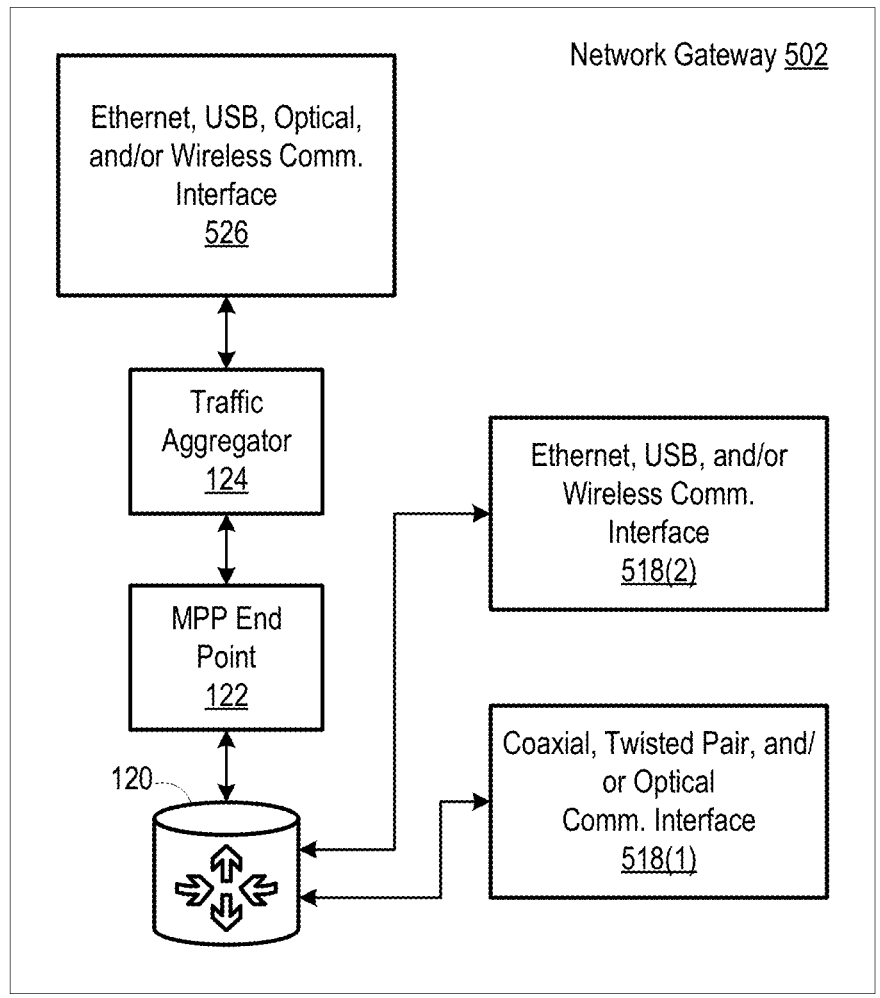
FIG. 5 is a schematic diagram of one embodiment of the network gateway of the FIG. 1 communication system.

FIG. 5 is a schematic diagram of a network gateway 502, which is one possible embodiment of network gateway 102 of FIG. 1, although it is appreciated that network gateway 102 is not limited to the embodiment of FIG. 5. Access communication interface 118(1), access communication interface 118(2), and local communication interface 126 are respectively embodied by access communication interface 518(1), access communication interface 518(2), and local communication interface 526, in network gateway 502. Access communication interface 518(1) is configured to communicatively couple to one or more of a coaxial electrical cable, a twisted pair electrical cable, and/or an optical cable. Access communication interface 518(2) is a wireless communication interface, and/or access communication interface 518(2) is configured to communicatively couple to one or more of an Ethernet electrical cable and a USB electrical cable. Local communication interface 526 is a wireless communication interface, and/or local communication interface 526 is configured to communicatively couple to one or more of an Ethernet electrical cable, a USB electrical cable, and an optical cable. The configuration of access communication interface 518(1), access communication interface 518(2), and local communication interface 526 could vary without departing from the scope hereof. For example, access communication interface 518(1) could be modified to be a wireless communication interface, and access communication interface 518(2) could be modified to communicatively coupled to a coaxial electrical cable and/or a twisted pair electrical cable.

FIGS. 6-14 illustrate several embodiments of communication system 100. It is understood, though, that communication system 100 is not limited to the embodiments of FIGS. 6-14. To the contrary, communication system 100 can have many other configurations, as long as communication system 100 includes an instance of network gateway 102 or a variation thereof. Some network gateway elements are omitted in FIGS. 6-14 for illustrative clarity. Additionally, elements of CPE 116 are not shown in FIGS. 6-14.

Figure 6:
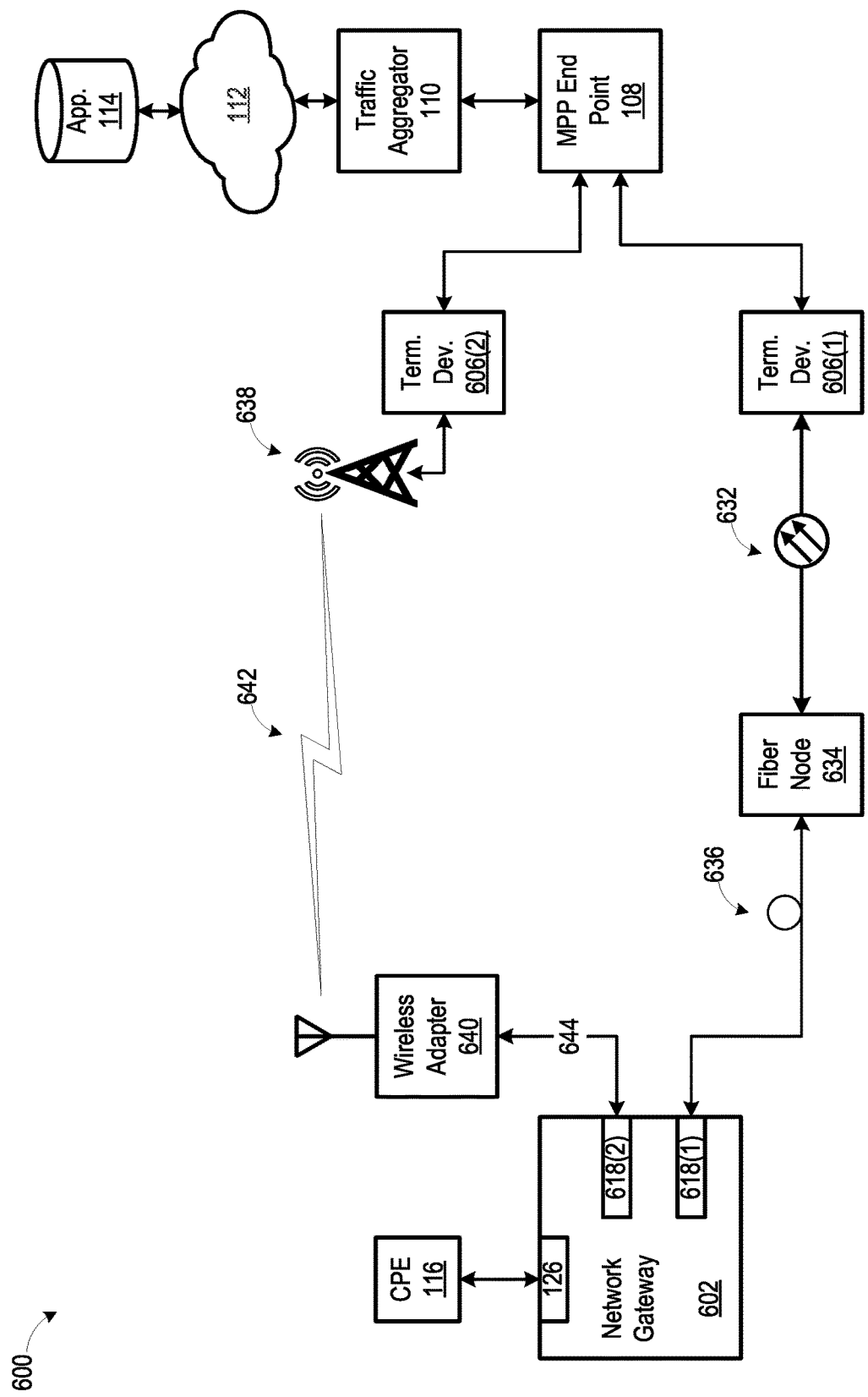
FIG. 6 is a schematic diagram of an embodiment of the FIG. 1 communication system where communication links are embodied by a hybrid optical-electrical communication link and a wireless communication link.

FIG. 6 is a schematic diagram of a communication system 600, which is an embodiment of communication system 100 where the communication links are embodied by a hybrid optical-electrical communication link and a wireless communication link. Network gateway 102 is embodied by a network gateway 602, and network gateway 602 includes an access communication interface 618(1) and an access communication interface 618(2), which are embodiments of access communication interface 118(1) and access communication interface 118(2), respectively. Termination devices 106(1) and 106(2) are embodied by termination devices 606(1) and 606(2), respectively.

Communication link 104(1) is embodied by an optical cable 632, a fiber node 634, and a coaxial electrical cable 636. Optical cable 632 is communicatively coupled between termination device 606(1) and fiber node 634, and coaxial electrical cable 636 is electrically coupled between fiber node 634 and access communication interface 618(1). Fiber node 634 is configured to interface optical cable 632 with coaxial electrical cable 636, and access communication interface 618(1) is configured to communicatively couple network gateway 602 with coaxial electrical cable 636. In some embodiments, termination device 606(1) includes a CMTS. In some alternate embodiments of communication system 600, optical cable 632 and fiber node 634 are omitted, such that coaxial electrical cable 636 directly communicatively couples network gateway 602 and termination device 606(1).

Communication link 104(2) is embodied by a wireless base station 638 and a wireless adapter 640, which communicate with each other via wireless signals 642. Wireless base station 638 is, for example, an evolved NodeB (eNB), a next generation NodeB (gNB), a WiFi-based wireless access point, an Integrated Access and Backhaul (IAB) access point, a microcell, a picocell, a femtocell, a macrocell, a Wi-Fi-based application, a satellite communication device, etc. In some embodiments, termination device 606(2) is a wireless communication system packet core, an EPC, a 5G wireless communication packet core, a 6G wireless communication packet core, a WiFi controller, a satellite communication system controller, a router, a switch, a hub, a USB controller, a Bluetooth controller, and extensions, modifications, and successions of any of the foregoing. Wireless adapter 640 is communicatively coupled to access communication interface 618(2) via an electrical cable 644. In some embodiments, electrical cable 644 is an Ethernet electrical cable or a USB electrical cable, and access communication interface 618(2) is configured to communicatively couple network gateway 602 to such electrical cable.

Figure 7:
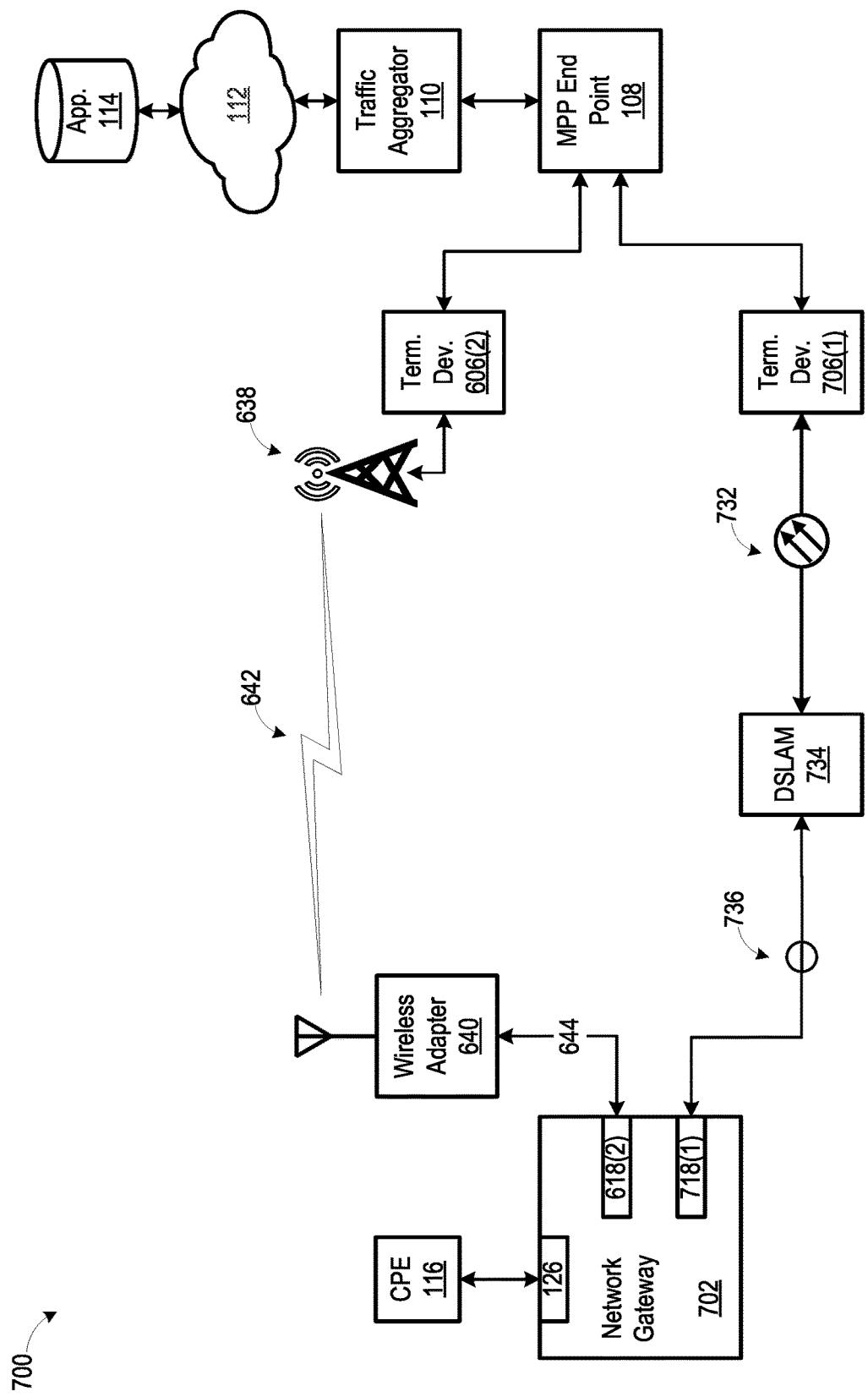
FIG. 7 is a schematic diagram of another embodiment of the FIG. 1 communication system where communication links are embodied by a hybrid optical-electrical communication link and a wireless communication link.

FIG. 7 is a schematic diagram of a communication system 700, which is another embodiment of communication system 100 where the communication links are embodied by a hybrid optical-electrical communication link and a wireless communication link. Communication system 700 is similar to communication system 600 of FIG. 6, but optical cable 632, fiber node 634, and coaxial electrical cable 636 are replaced with an optical cable 732, a DSLAM 734, and a twisted pair electrical cable 736, respectively. Additionally, network gateway 602 is substituted with network gateway 702, where access communication interface 618(1) is replaced with an access communication interface 718(1) that is configured to communicatively couple to twisted pair electrical cable 736. Finally, termination device 606(1) is swapped with an optical termination device 706(1). In some alternate embodiments of communication system 700, optical cable 732 is omitted, and DSLAM 734 is incorporated in termination device 706(1), such that twisted pair electrical cable 736 directly communicatively couples network gateway 702 and termination device 706(1).

Figure 8:
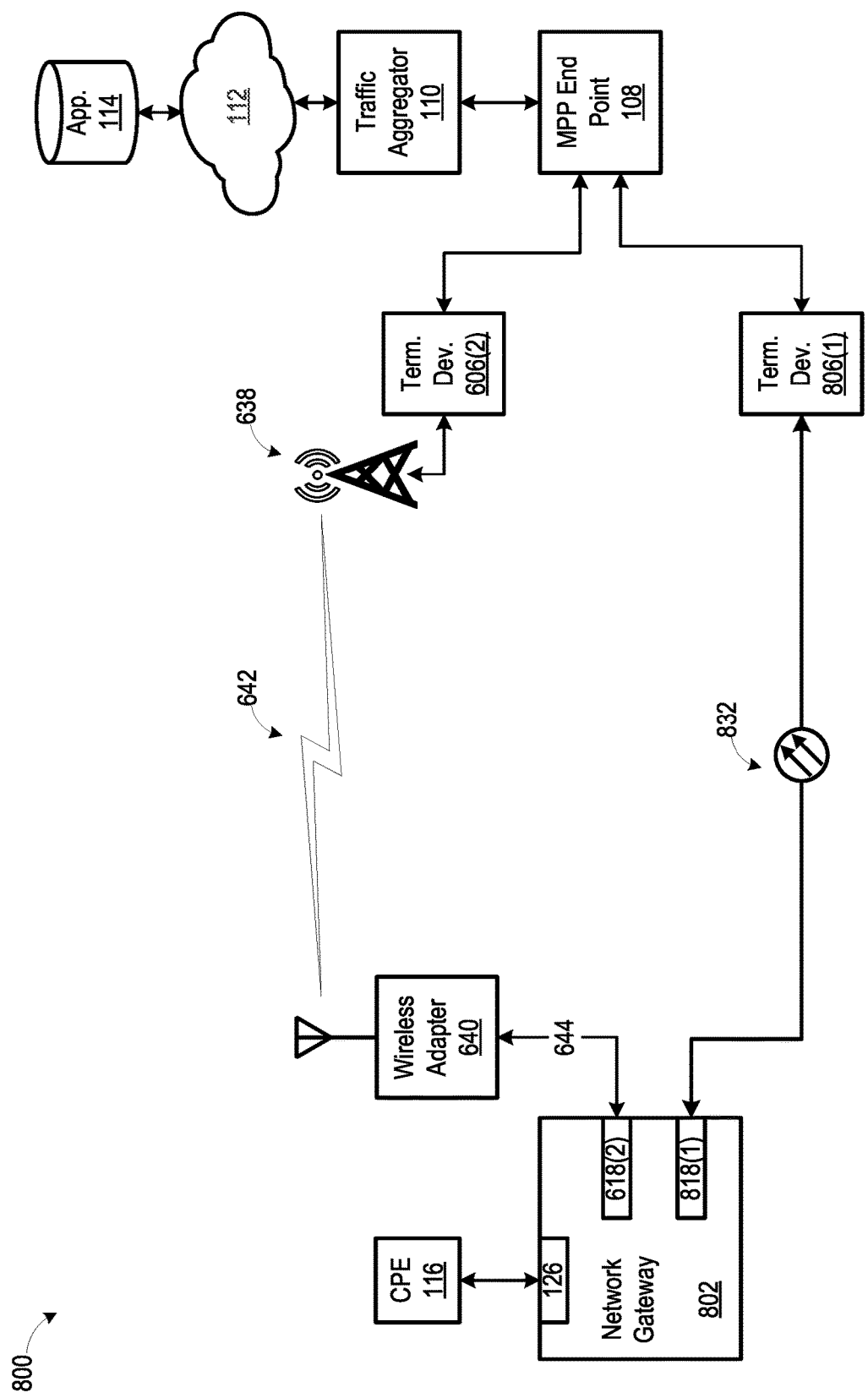
FIG. 8 is a schematic diagram of an embodiment of the FIG. 1 communication system where communication links are embodied by an optical communication link and a wireless communication link.

FIG. 8 is a schematic diagram of a communication system 800, which is an embodiment of communication system 100 where the communication links are embodied by an optical communication link and a wireless communication link. Communication system 800 is similar to communication system 600 of FIG. 6, but optical cable 632, fiber node 634, and coaxial electrical cable 636 are replaced with an optical cable 832. Additionally, network gateway 602 is substituted with network gateway 802, where access communication interface 618(1) is replaced with an access communication interface 818(1) that is configured to communicatively couple to optical cable 832. Additionally, termination device 606(1) is swapped with an optical termination device 806 (1). In some embodiments, optical termination device 806(1) includes an OLT or an ONU.

Figure 9:
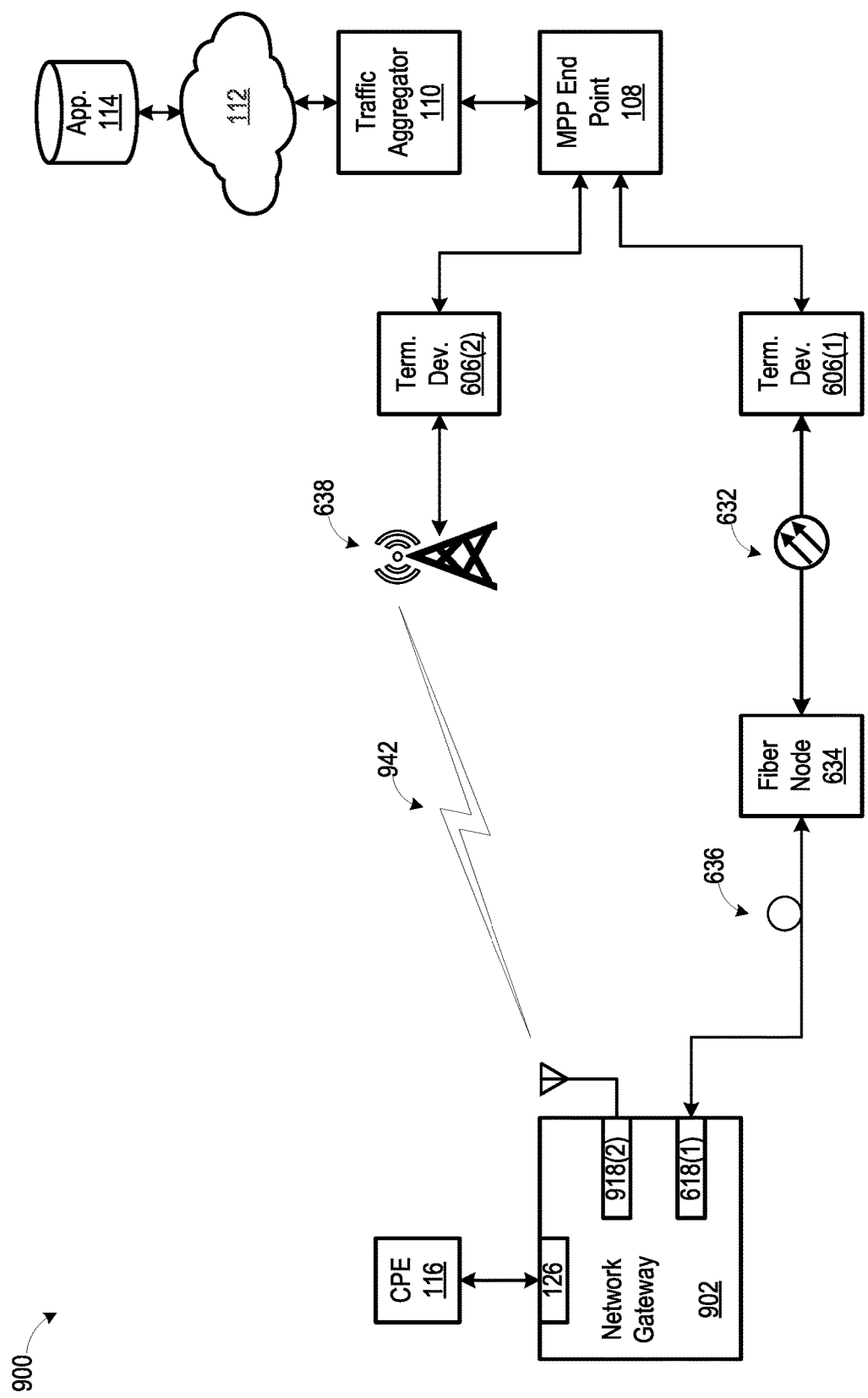
FIG. 9 is a schematic diagram of another embodiment of the FIG. 1 communication system where communication links are embodied by a hybrid optical-electrical communication link and a wireless communication link.

FIG. 9 is a schematic diagram of a communication system 900, which is another embodiment of communication system 100 where the communication links are embodied by a hybrid optical-electrical communication link and a wireless communication link. Communication system 900 is similar to communication system 600 of FIG. 6, but network gateway 602 is substituted with network gateway 902, where access communication interface 618(2) is replaced with an access communication interface 918(2). Access communication interface 918(2) is a wireless communication interface that is capable of directly communicating with wireless base station 638 via wireless signals 942. Therefore, wireless adapter 640 and electrical cable 644 are omitted from communication system 900.

Figure 10:
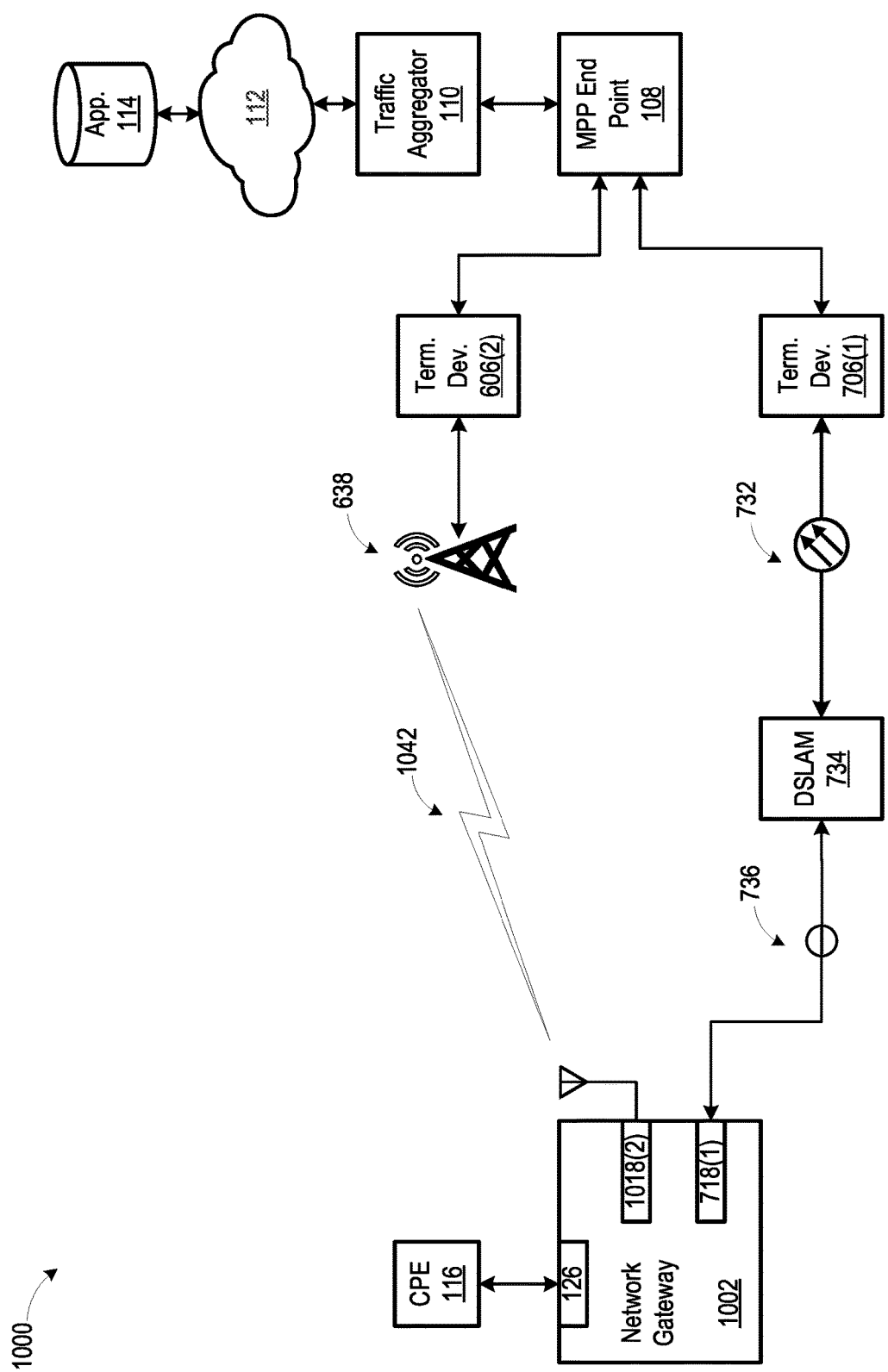
FIG. 10 is a schematic diagram of yet another embodiment of the FIG. 1 communication system where communication links are embodied by a hybrid optical-electrical communication link and a wireless communication link.

FIG. 10 is a schematic diagram of a communication system 1000, which is yet another embodiment of communication system 100 where the communication links are embodied by a hybrid optical-electrical communication link and a wireless communication link. Communication system 1000 is similar to communication system 700 of FIG. 7, but network gateway 702 is substituted by network gateway 1002, where access communication interface 618(2) is replaced with an access communication interface 1018(2). Access communication interface 1018(2) is a wireless communication interface that is capable of directly communicating with wireless base station 638 via wireless signals 1042. Therefore, wireless adapter 640 and electrical cable 644 are omitted from communication system 1000.

Figure 11:
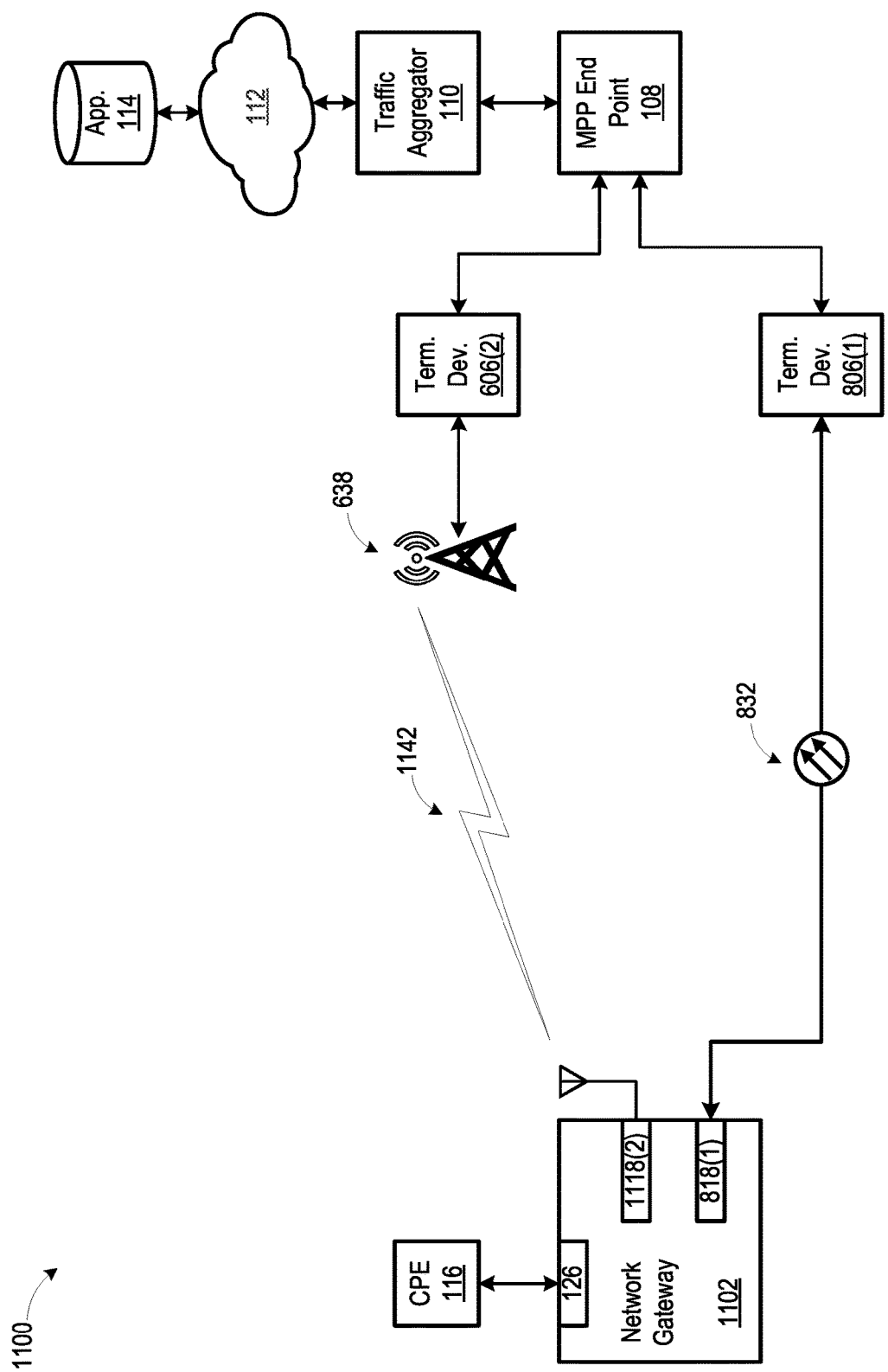
FIG. 11 is a schematic diagram of another embodiment of the FIG. 1 communication system where communication links are embodied by an optical communication link and a wireless communication link.

FIG. 11 is a schematic diagram of a communication system 1100, which is another embodiment of communication system 100 where the communication links are embodied by an optical communication link and a wireless communication link. Communication system 1100 is similar to communication system 800 of FIG. 8, but network gateway 802 is substituted by network gateway 1102, where access communication interface 618(2) is replaced with an access communication interface 1118(2). Access communication interface 1118(2) is a wireless communication interface that is capable of directly communicating with wireless base station 638 via wireless signals 1142. Therefore, wireless adapter 640 and electrical cable 644 are omitted from communication system 1100.

Figure 12:
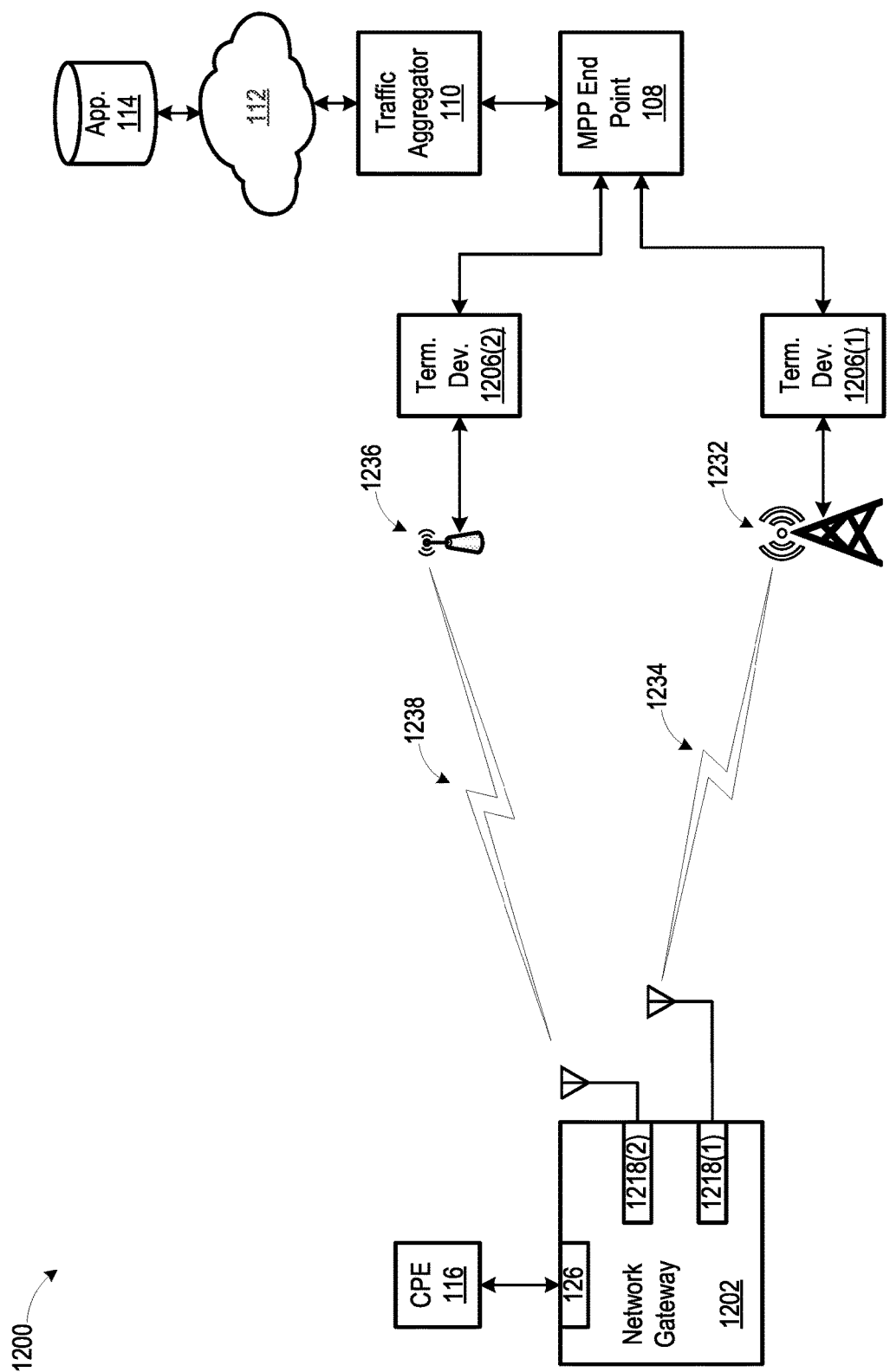
FIG. 12 is a schematic diagram of an embodiment of the FIG. 1 communication system where communication links are embodied by wireless communication links.

FIG. 12 is a schematic diagram of a communication system 1200, which is an embodiment of communication system 100 where the communication links are embodied by wireless communication links. Network gateway 102 is embodied by a network gateway 1202, and network gateway 1202 includes a wireless access communication interface 1218(1) and a wireless access communication interface 1218(2), which are embodiments of access communication interface 118(1) and access communication interface 118(2), respectively. Termination devices 106(1) and 106(2) are embodied by termination devices 1206(1) and 1206(2), respectively.

Communication link 104(1) is embodied by a wireless base station 1232 communicating with wireless access communication interface 1218(1) via wireless signals 1234. Communication link 104(2) is embodied by a wireless base station 1236 communicating with wireless access communication interface 1218(2) via wireless signals 1238. In some embodiments, wireless base stations 1232 and 1236 are different types of wireless base stations. For example, in certain embodiments, wireless base station 1232 is a large cellular wireless base station, e.g. a microcell, and wireless base station 1236 is a small wireless base station, e.g. a microcell, a nanocell, a picocell, or a femtocell. As another example, in some other embodiments, wireless base station 1232 is a cellular wireless base station, and wireless base station 1236 is a non-cellular wireless base, e.g. a Wi-Fi wireless base station or a Bluetooth wireless base station. Each termination device 1206 is, for example, a wireless communication system packet core, an EPC, a 5G wireless communication packet core, a 6G wireless communication packet core, a WiFi controller, a satellite communication system controller, a router, a switch, a hub, a USB controller, a Bluetooth controller, and extensions, modifications, and successions of any of the foregoing. Additionally, each termination device 1206 instance could be replaced with a common termination device supporting each of wireless base stations 1232 and 1236.

Figure 18:
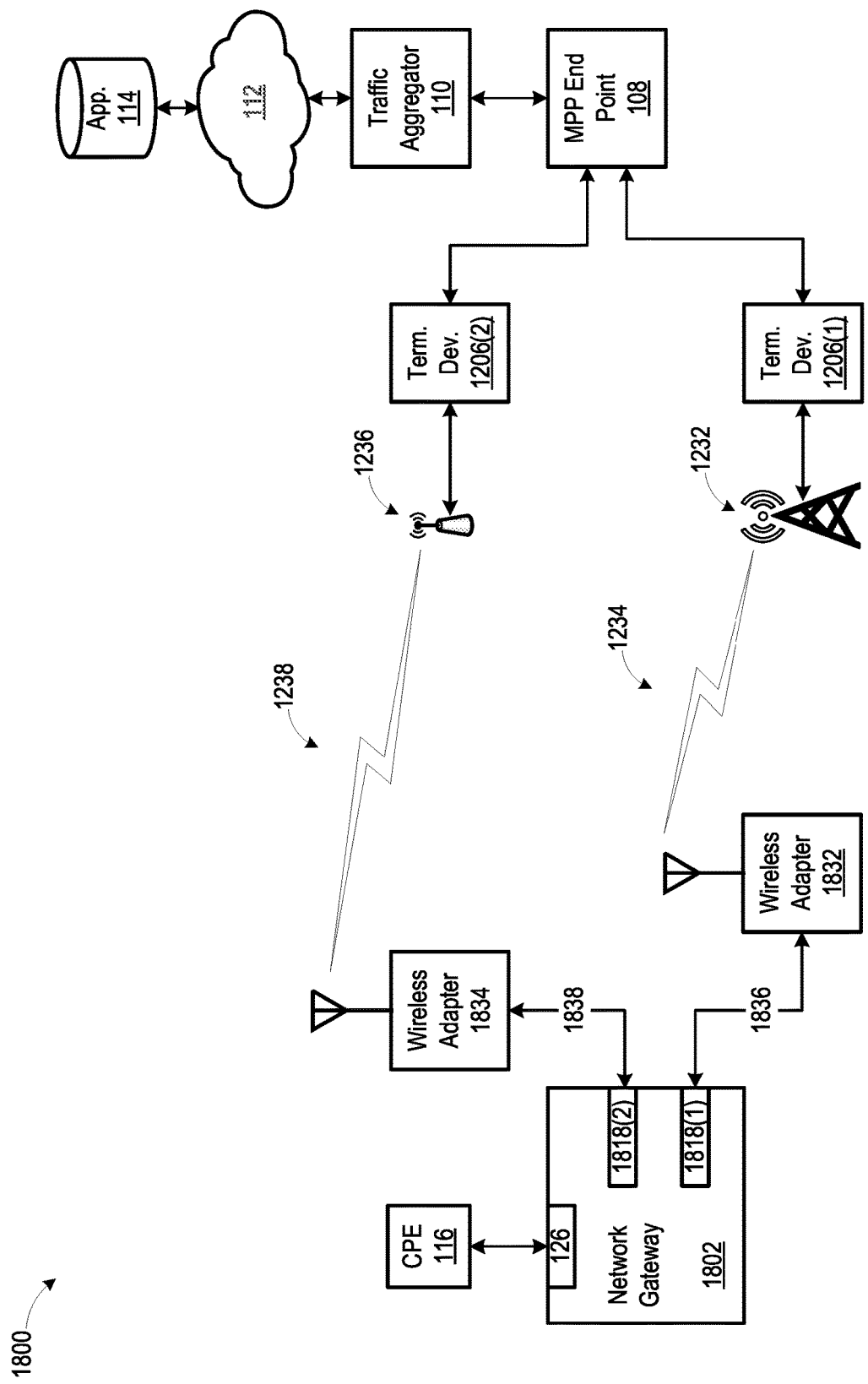
FIG. 18 is a schematic diagram of an alternate embodiment of the FIG. 12 communication system.

Communication system 1200 could be modified to use external wireless adapters in place of wireless communication interfaces 1218(1) and 1218(2). For example, FIG. 18 is a schematic diagram of a communication system 1800, which is similar to communication system 1200 of FIG. 12, but includes wireless adapters 1832 and 1834 electrically coupled to a network gateway 1802 via electrical cables 1836 and 1838, respectively. Network gateway 1802 is an embodiment of network gateway 102, and network gateway 1802 includes an access communication interface 1818(1) and an access communication interface 1818(2), which are embodiments of access communication interface 118(1) and access communication interface 118(2), respectively. Access communication interface 1818(1) is configured to communicatively couple to electrical cable 1836, and access communication interface 1812(2) is configured to communicatively couple to electrical cable 1838. In some embodiments, each of electrical cables 1836 and 1838 is an Ethernet electrical cable or a USB electrical cable.

Figure 13:
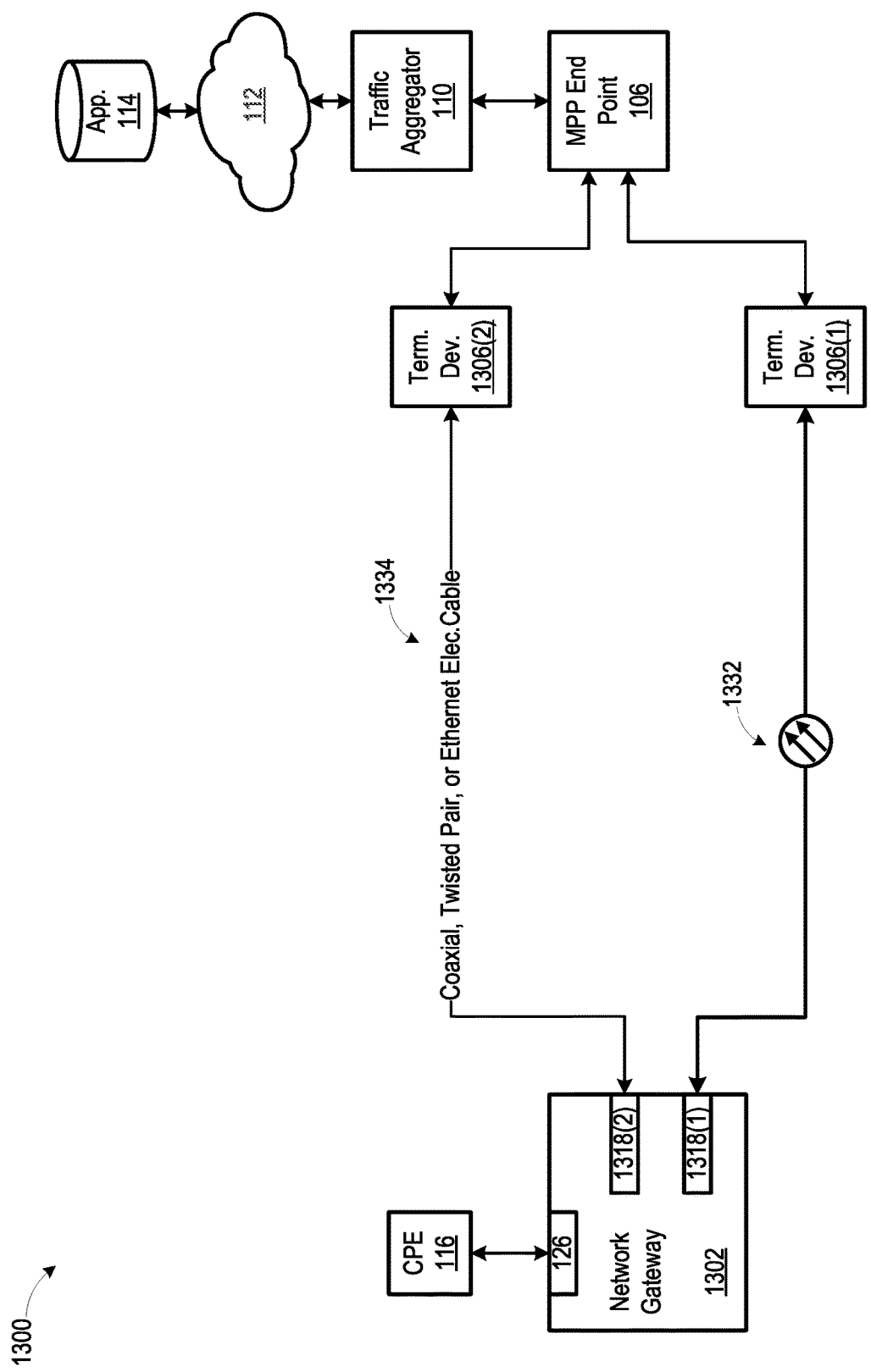
FIG. 13 is a schematic diagram of an embodiment of the FIG. 1 communication system where communication links are embodied by wireline communication links.

FIG. 13 is a schematic diagram of a communication system 1300, which is an embodiment of communication system 100 where the communication links are embodied by wireline communication links. Network gateway 102 is embodied by a network gateway 1302, and network gateway 1302 includes an optical access communication interface 1318(1) and an electrical access communication interface 1318(2), which are embodiments of access communication interface 118(1) and access communication interface 118(2), respectively. Termination devices 106(1) and 106(2) are embodied by termination devices 1306(1) and 1306(2), respectively.

Communication link 104(1) is embodied by an optical cable 1332, and communication link 104(2) is embodied by an electrical cable 1334, which is, for example, a coaxial electrical cable, a twisted pair electrical cable, or an Ethernet electrical cable. In some embodiments, termination device 1306(1) includes an OLT or an ONU, and termination device 1306(2) includes a CMTS, a DSLAM, or an Ethernet network interface.

Figure 14:
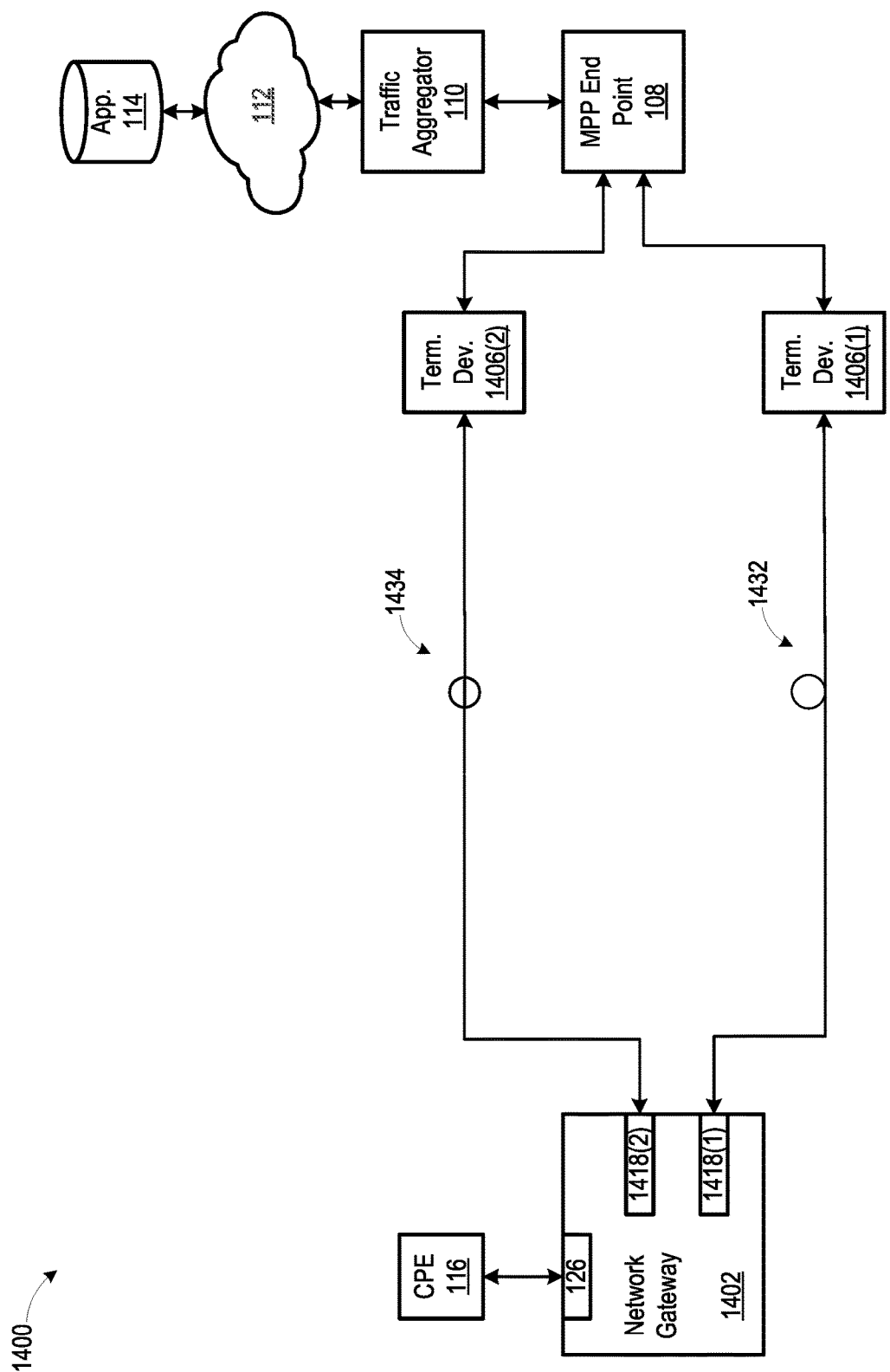
FIG. 14 is a schematic diagram of another embodiment of the FIG. 1 communication system where communication links are embodied by wireline communication links.

FIG. 14 is a schematic diagram of a communication system 1400, which is another embodiment of communication system 100 where the communication links are embodied by wireline communication links. Network gateway 102 is embodied by a network gateway 1402, and network gateway 1402 includes an access communication interface 1418(1) and an access communication interface 1418(2), which are embodiments of access communication interface 118(1) and access communication interface 118(2), respectively. Termination devices 106(1) and 106(2) are embodied by termination devices 1406(1) and 1406(2), respectively.

Communication link 104(1) is embodied by a coaxial electrical cable 1432, and communication link 104(2) is embodied by a twisted pair electrical cable 1434. Access communication interface 1418(1) is configured to communicatively couple network gateway 1402 to coaxial electrical cable 1432, and access communication interface 1418(2) is configured to communicatively couple network gateway 1402 to twisted pair electrical cable 1434. In some embodiments, termination device 1406(1) includes a CMTS, and termination device 1406(2) includes a DSLAM.

Figure 15:
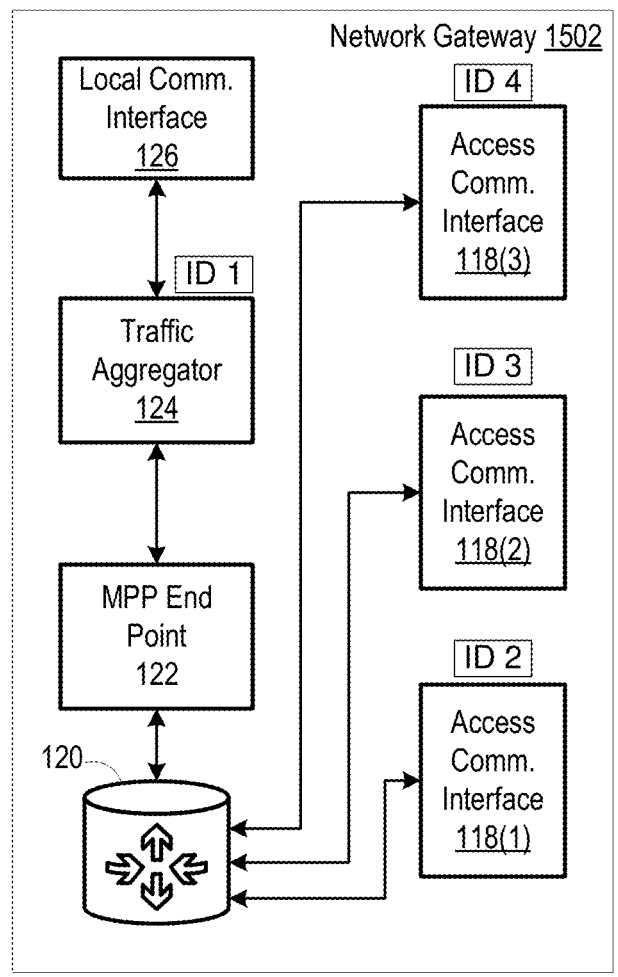
FIG. 15 is a schematic diagram of an alternate embodiment of the network gateway of the FIG. 1 communication system.

Referring again to FIG. 1, network gateway 102 could be modified to include additional access communication interface 118 instances, such as to achieve greater redundancy and/or greater data transmission throughput. For example, FIG. 15 is a schematic diagram of a network gateway 1502, which is an alternate embodiment of network gateway 102 including three instances of access communication interface 118. Network gateway 5102 is cable of continuing to operate in event of failure of two communication links 104. For example, in the event of failure of respective communication links 104 coupled to each of access communication interfaces 118(1) and 118(2), network gateway 1502 is capable transferring data packets via access communication interface 118(3) and its respective communication link 104.

Additionally, in a manner analogous to that discussed above with respect to FIG. 1, network gateway 1502 presents a single network identifier ID1 representing the network gateway to each of network application 114 and CPE 116, even though each access communication interface 118(1), 118(2), 118(3) is represented by its own respective network identifier ID2, ID3, and ID4, where each of ID1, ID2, ID3, and ID4 are different. Consequently, failure of a communication link 104 is imperceptible to CPE 116 and network application 114, and network gateway 1502 does not experience downtime in response to the communication link 104 failure. In some embodiments, each of ID1, ID2, ID3, and ID4 is an IP address, such as a version 4 IP address, a version 6 IP address, or a successor version IP address.

Figure 16:
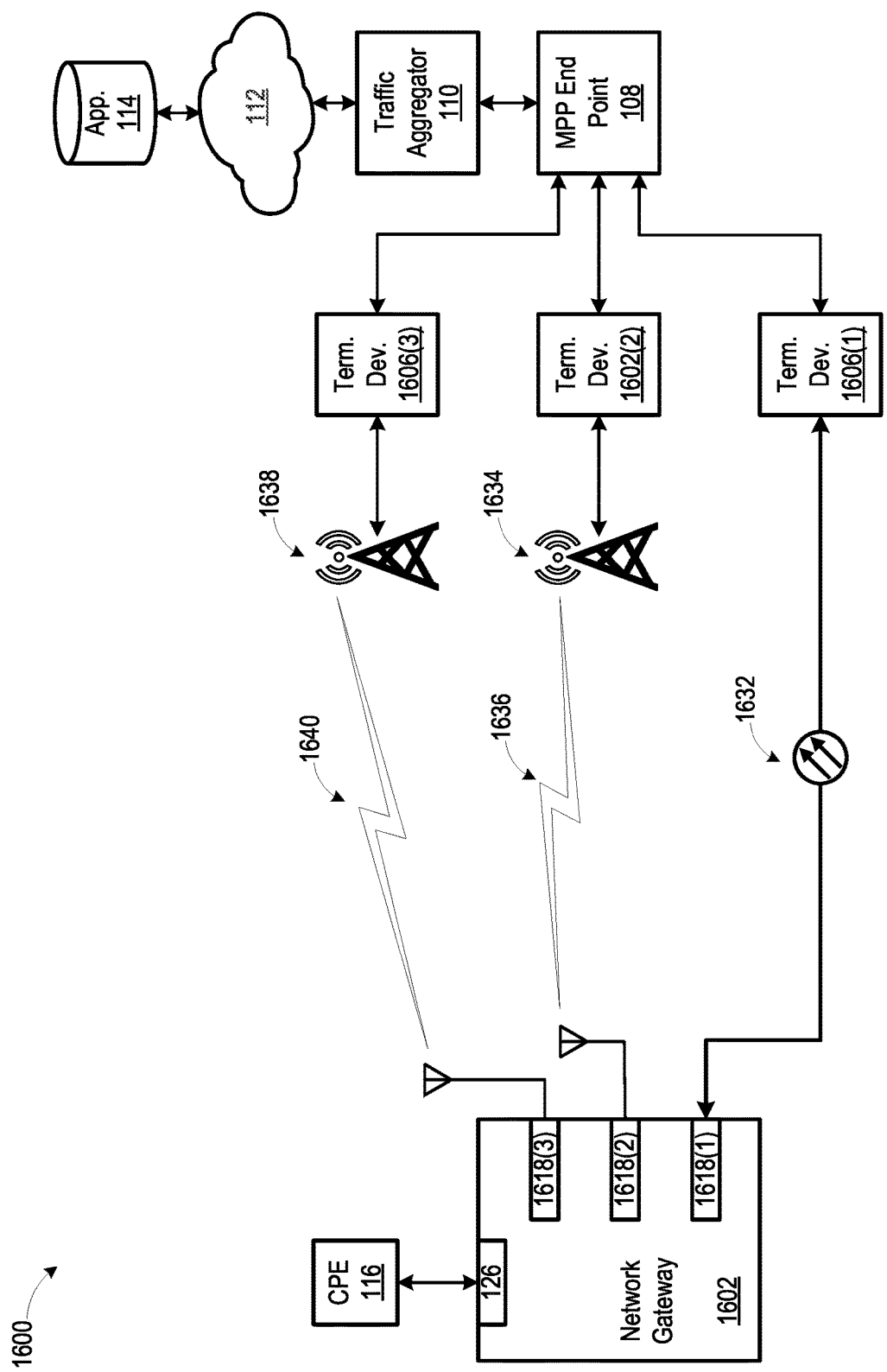
FIG. 16 is a schematic diagram of a communication system including an embodiment of the FIG. 15 network gateway, according to an embodiment.

FIG. 16 is a schematic diagram of a communication system 1600, which is an embodiment of communication system 100 where network gateway 102 is replaced by network gateway 1602. Network gateway 1602 is an embodiment of network 102 and therefore includes three access communication interfaces 1618(1)-1618(3), which are embodiments of access communication interfaces 118(1)-118(3) of FIG. 15. Access communication interface 1618(1) is configured to communicatively couple network gateway 1602 to an optical cable, and each of access communication interfaces 1618(2) and 1618(3) is a wireless access communication interface. A first communication link 104 is embodied by an optical cable 1632, and a second communication link 104 is embodied by a wireless base station 1634 communicating with wireless access communication interface 1618(2) via wireless signals 1636. A third communication link 104 is embodied by a wireless base station 1638 communicating with wireless access communication interface 1618(3) via wireless signals 1640. In some embodiments, termination device 1606(1) is a OLT or an ONU, and each of termination device 1606(2) and 1606(3) is a wireless communication system packet core, an EPC, a 5G wireless communication packet core, a 6G wireless communication packet core, a WiFi controller, a satellite communication system controller, a router, a switch, a hub, a USB controller, a Bluetooth controller, and extensions, modifications, and successions of any of the foregoing.

Figure 17:
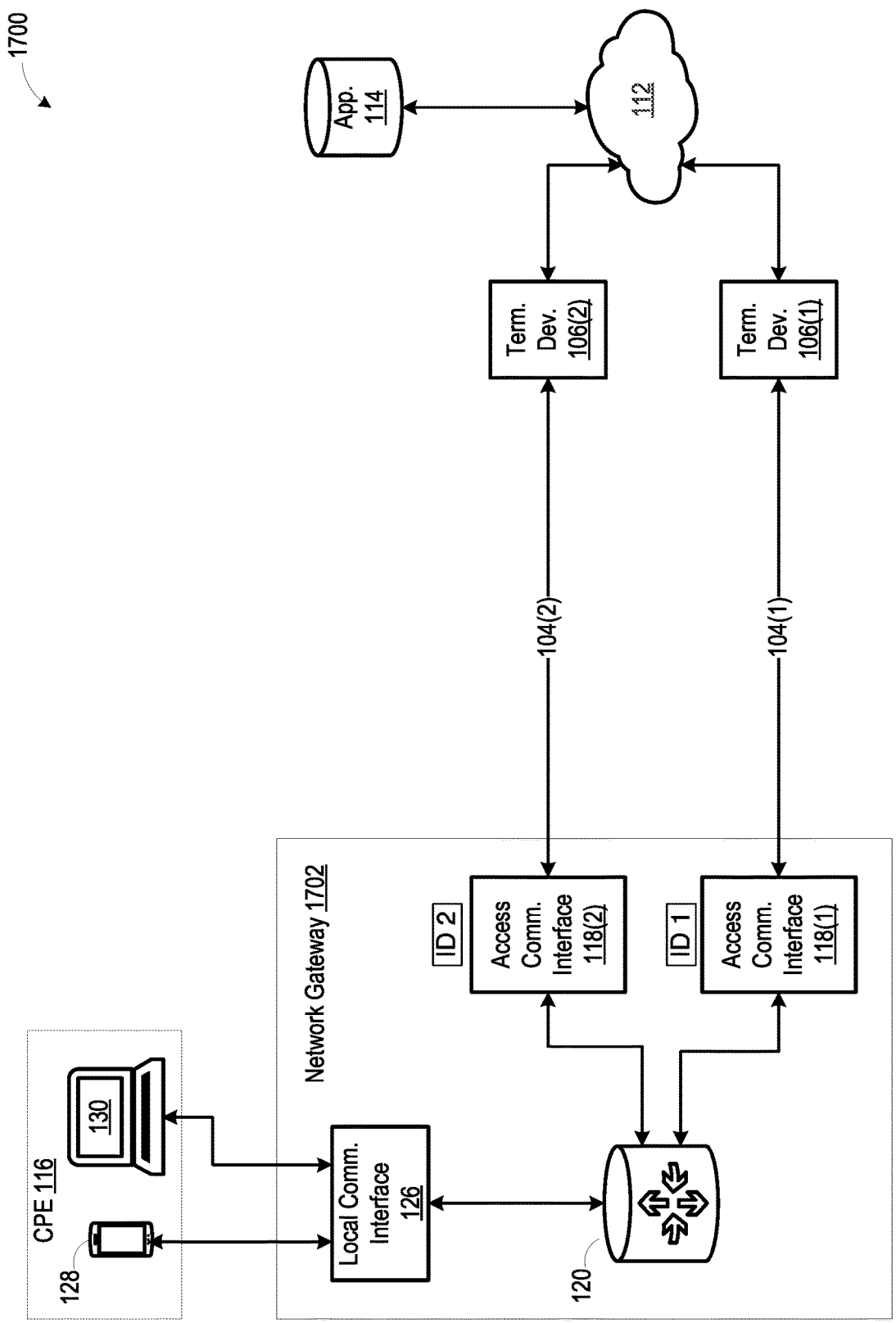
FIG. 17 is a schematic diagram of a communication system including an alternate network gateway, according to an embodiment.

Referring again to FIG. 1, presence of MPP end point 122 in network gateway 102 achieves significant advantages, discussed above. However, MPP end point 122 requires a counterpart MPP end point, e.g. MPP end point 108, to achieve multi-path data packet transfer. It may be undesirable to implement a counterpart MPP end point in some applications, such as due to cost and/or complexity associated with the MPP end point. Accordingly, MPP end point 122 and traffic aggregator 124 are omitted in some alternate embodiments of network gateway 102. For example, FIG. 17 is a schematic diagram of a communication system 1700, which is an alternate embodiment of communication system 100 where network gateway 102 is replaced with a network gateway 1702. Network gateway 1702 is like network gateway 102 but with MPP end point 122 and traffic aggregator 124 omitted. Consequently, counterpart MPP end point 108 and its associated traffic aggregator 110 are no longer required, and these elements are therefore omitted from communication system 1700.

Network gateway 1702 is configured to transmit data packets between CPE 116 and network application 114 using either access communication interface 118(1) or access communication interface 118(2), thereby providing redundancy in case of failure of a communication link 104. However, in contrast to network gateway 102, network gateway 1702 does not present a single network identifier representing the network gateway to each of network application 114 and CPE 116. Instead, network gateway 1702 will present a network ID corresponding to whichever access communication interface 118 that is transmitting data packets. For example, network gateway 1702 will present a network identifier ID1 to each of CPE 116 and network application 114, if network gateway 1702 is transmitting data packets via access communication interface 118(1). On the other hand, network gateway 1702 will present a network identifier ID2 to each of CPE 116 and network application 114, if network gateway 1702 is transmitting data packets via access communication interface 118(2). Network identifiers ID1 and ID2 are different from each other, and in some embodiments, each of ID1 and ID2 is an IP address, such as a version 4 or version 6 IP address. Consequently, network gateway 1702 will typically experience a short downtime, e.g. less than one minute, in response to failure of a communication link 104.

Notwithstanding the foregoing, some alternate embodiments of network gateway 1702 are configured to transmit a common network identifier, such as a common IP address, via each of access communication interfaces 118(1) and 118(2). Such transmission of a common network identifier may enable simultaneous data transmission via each of communication links 104(1) and 104(2), as well as reduce downtime in response to a communication link 104 failure.

However, access networks associated with communication links 104 need to be capable of accepting such common network identifier.

Combinations of Features

Features described above may be combined in various ways without departing from the scope hereof. The following examples illustrate some possible combinations.

(A1) A method for redundant communication at a network gateway may include (1) exchanging data packets with a network application via a first access communication interface, (b) exchanging data packets with customer premises equipment (CPE) via a local communication interface, and (c) in response to occurrence of a first event, exchanging at least some data packets with the network application via a second access communication interface that is different from the first access communication interface.

(A2) In the method denoted as (A1), the first event may include failure or degradation of a communication link communicatively coupled to the first access communication interface.

(A3) In the method denoted as (A1), the first event may include availability of a communication link communicatively coupled to the second access communication interface.

(A4) Any one of the methods denoted as (A1) through (A3) may further include representing the network gateway to the network application using a first network identifier when using each of the first access communication interface and the second access communication interface.

(A5) In the method denoted as (A4), the first network identifier may include a first Internet Protocol (IP) address.

(A6) The method denoted as (A5) may further include (1) representing the first access communication interface using a second IP address that is different from the first IP address, and (2) representing the second access communication interface using a third IP address that is different from each of the first IP address and the second IP address.

(A7) Any one of the methods denoted as (A4) through (A6) may further include representing the network gateway to the CPE using the first network identifier.

(A8) Any one of the methods denoted as (A1) through (A7) may further include aggregating data packets received at the network gateway from the CPE for transfer to the network application via either the first local communication interface or the second local communication interface.

(A9) Any one of the methods denoted as (A1) through (A8) may further include exchanging data packets with the network application at least partially using a multi-path protocol.

(A10) In the method denoted as (A9), the multi-path protocol may include a multi-path transmission control protocol (MPTCP).

(A11) In any one of the methods denoted as (A1) through (A10), the first access communication interface may be configured to communicatively couple to one of a coaxial electrical cable, a twisted pair electrical cable, and an optical cable, and the second access communication interface may be configured to communicatively couple to one of an Ethernet electrical cable and a universal serial bus (USB) electrical cable.

(A12) In any one of the methods denoted as (A1) through (A10), the first access communication interface may be configured to communicatively couple to one of a coaxial electrical cable, a twisted pair electrical cable, and an optical cable, and the second access communication interface include a wireless communication interface.

(A13) In any one of the methods denoted as (A1) through (A10), each of the first access communication interface and the second access communication interface may include a respective wireless communication interface.

(A14) Any one of the methods denoted as (A1) through (A13) may further include routing data packets between (a) the CPE and (b) each of the first access communication interface and the second access communication interface.

(B1) A network gateway with redundant communication capability may include (1) a first access communication interface, (2) a second access communication interface, (3) a local communication interface, and (4) a router. The router may be configured to (1) route data packets between (a) customer premises equipment (CPE) communicatively coupled to the local communication interface and (b) each of the first access communication interface and the second access communication interface, and (2) in response to occurrence of a first event, route at least some data packets between the CPE and the second access communication interface, instead of between the CPE and the first access communication interface.

(B2) In the network gateway device denoted as (B1), the first event may include failure or degradation of a communication link communicatively coupled to the first access communication interface.

(B3) In the network gateway denoted as (B1), the first event may include availability of a communication link communicatively coupled to the second access communication interface.

(B4) Any one of the network gateways denoted as (B1) through (B3) may further include a multi-path protocol end point configured to exchange data packets with a network application via each of the first and second access communication interfaces using a multi-path data transmission protocol.

(B5) In the network gateway denoted as (B4), the multi-path protocol may include a multi-path transmission control protocol (MPTCP).

(B6) In any one of the network gateways denoted as (B1) through (B5), the first access communication interface may be configured to communicatively couple to one of a coaxial electrical cable, a twisted pair electrical cable, and an optical cable, and the second access communication interface may be configured to communicatively couple to one of an Ethernet electrical cable and a universal serial bus (USB) electrical cable.

(B7) In any one of the network gateways denoted as (B1) through (B5), the first access communication interface may be configured to communicatively couple to one of a coaxial electrical cable, a twisted pair electrical cable, and an optical cable, and the second access communication interface may include a wireless communication interface.

(B8) In any one of the network gateways denoted as (B1) through (B5), each of the first access communication interface and the second access communication interface may include a respective wireless communication interface.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for redundant communication at a network gateway, comprising:
   exchanging data packets with a network application via a first access communication interface;
   exchanging data packets with customer premises equipment (CPE) via a local communication interface;
   in response to occurrence of a first event, exchanging at least some data packets with the network application via a second access communication interface that is different from the first access communication interface; and
   representing the network gateway to the network application using a first Internet Protocol (IP) address irrespective of whether using the first access communication interface to exchange data packets with the network application or the second access communication interface to exchange data packets with the network application.

2. The method of claim 1, wherein the first event comprises failure or degradation of a communication link communicatively coupled to the first access communication interface.

3. The method of claim 1, wherein the first event comprises availability of a communication link communicatively coupled to the second access communication interface.

4. The method of claim 1, further comprising representing the network gateway to the CPE using the first IP address.

5. The method of claim 1, further comprising aggregating data packets received at the network gateway from the CPE for transfer to the network application via either the first access communication interface or the second access communication interface.

6. The method of claim 5, further comprising exchanging data packets with the network application at least partially using a multi-path protocol.

7. The method of claim 6, wherein the multi-path protocol comprises a multi-path transmission control protocol (MPTCP).

8. The method of claim 1, wherein:
   the first access communication interface is configured to communicatively couple to one of a coaxial electrical cable, a twisted pair electrical cable, and an optical cable; and
   the second access communication interface is configured to communicatively couple to one of an Ethernet electrical cable and a universal serial bus (USB) electrical cable.

9. The method of claim 1, wherein:
   the first access communication interface is configured to communicatively couple to one of a coaxial electrical cable, a twisted pair electrical cable, and an optical cable; and
   the second access communication interface comprises a wireless communication interface.

10. The method of claim 1, wherein each of the first access communication interface and the second access communication interface comprises a respective wireless communication interface.

11. The method of claim 1, further comprising routing data packets between (a) the CPE and (b) each of the first access communication interface and the second access communication interface.

12. A method for redundant communication at a network gateway, comprising:
   exchanging data packets with a network application via a first access communication interface;
   exchanging data packets with customer premises equipment (CPE) via a local communication interface;
   in response to occurrence of a first event, exchanging at least some data packets with the network application via a second access communication interface that is different from the first access communication interface;
   representing the network gateway to the network application using a first network identifier irrespective of whether using the first access communication interface to exchange data packets with the network application or the second access communication interface to exchange data packets with the network application, the first network identifier including a first Internet Protocol (IP) address;
   representing the first access communication interface to a router of the network gateway using a second IP address that is different from the first IP address; and
   representing the second access communication interface to the router of the network gateway using a third IP address that is different from each of the first IP address and the second IP address.

13. A network gateway with redundant communication capability, comprising:
   a first access communication interface;
   a second access communication interface;
   a local communication interface;
   a router configured to:
      route data packets between (a) customer premises equipment (CPE) communicatively coupled to the local communication interface and (b) each of the first access communication interface and the second access communication interface, and
      in response to occurrence of a first event, route at least some data packets between the CPE and the second access communication interface, instead of between the CPE and the first access communication interface; and
   a multi-path protocol end point configured to present a single Internet Protocol (IP) address to the CPE irrespective of whether the router is routing data packets between the CPE and the first access communication interface or between the CPE and the second access communication interface.

14. The network gateway device of claim 13, wherein the first event comprises failure or degradation of a communication link communicatively coupled to the first access communication interface.

15. The network gateway of claim 13, wherein the first event comprises availability of a communication link communicatively coupled to the second access communication interface.

16. The network gateway of claim 13, wherein the multi-path protocol end point is further configured to exchange data packets with a network application via each of the first and second access communication interfaces using a multi-path data transmission protocol.

17. The network gateway of claim 16, where the multi-path data transmission protocol comprises a multi-path transmission control protocol (MTCP).

18. The network gateway of claim 13, wherein:
   the first access communication interface is configured to communicatively couple to one of a coaxial electrical cable, a twisted pair electrical cable, and an optical cable; and the second access communication interface is configured to communicatively couple to one of an Ethernet electrical cable and a universal serial bus (USB) electrical cable.

19. The network gateway of claim 13, wherein:
the first access communication interface is configured to communicatively couple to one of a coaxial electrical cable, a twisted pair electrical cable, and an optical cable; and
the second access communication interface comprises a wireless communication interface.

20. The network gateway of claim 13, wherein each of the first access communication interface and the second access communication interface comprises a respective wireless communication interface.

\* \* \* \* \*